May 30, 1972     W. E. C. MOORE     3,666,629
APPARATUS FOR TRANSFERRING ANAEROBIC BACTERIA
Filed June 18, 1970     2 Sheets-Sheet 1

INVENTOR
WALTER E. C. MOORE
BY
Seidel, Gonda & Goldhammer
ATTORNEYS.

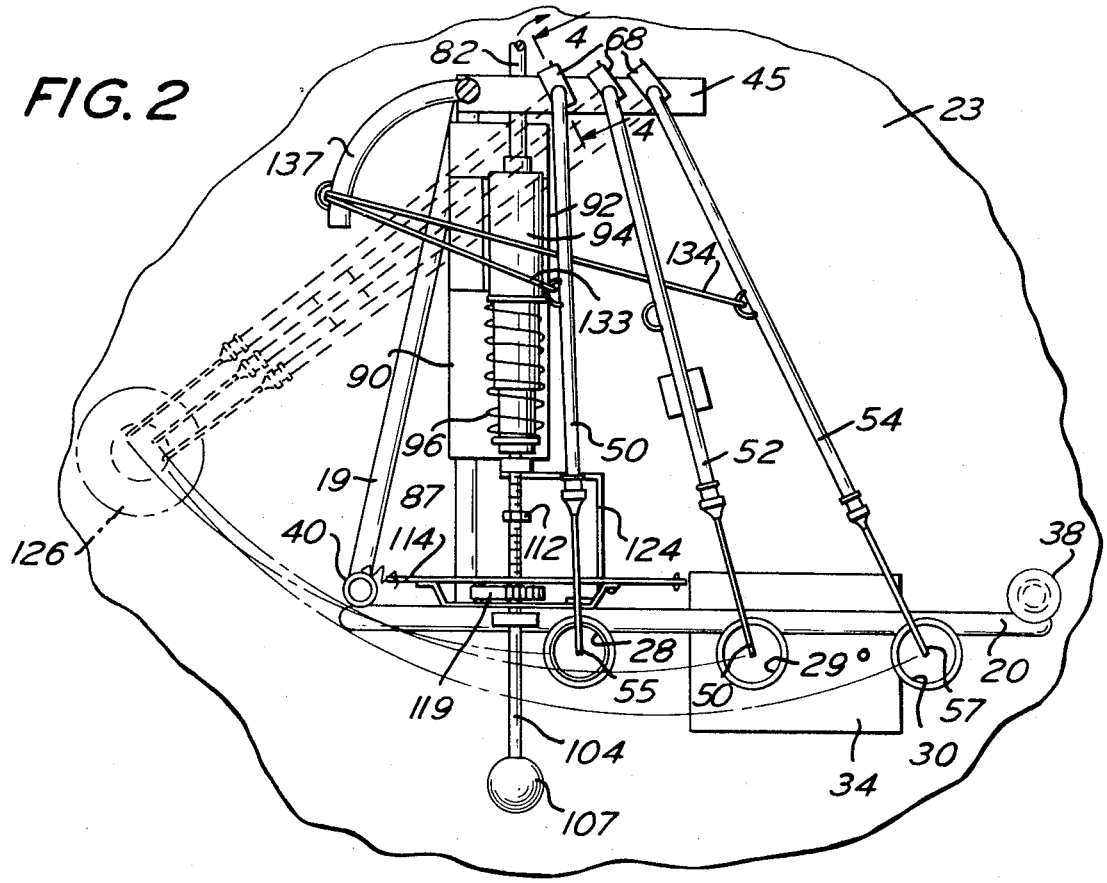
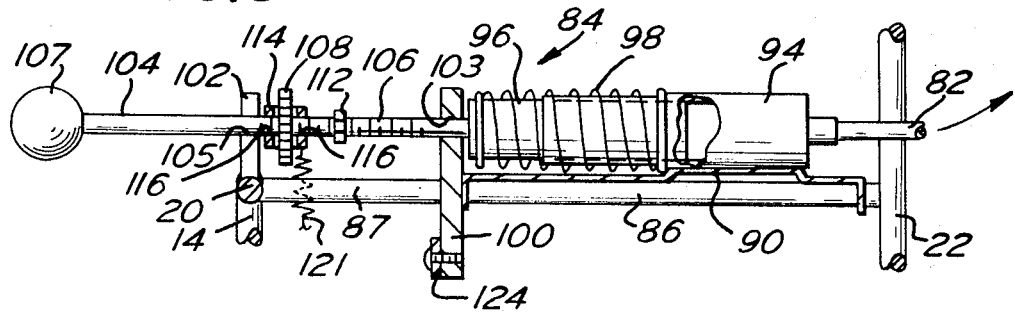
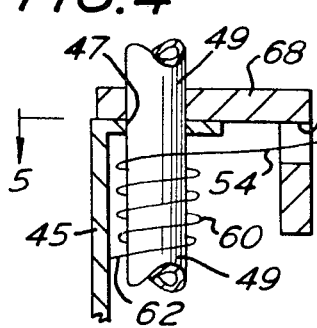

United States Patent Office 3,666,629
Patented May 30, 1972

3,666,629
APPARATUS FOR TRANSFERRING ANAEROBIC BACTERIA
Walter E. C. Moore, Blacksburg, Va., assignor to Virginia Polytechnic Institute Educational Foundation, Blacksburg, Va.
Filed June 18, 1970, Ser. No. 47,480
Int. Cl. C12b 1/02
U.S. Cl. 195—127          7 Claims

ABSTRACT OF THE DISCLOSURE

An apparatus for transfer of anaerobic bacteria under oxygen-free conditions having at least one pivotally mounted discharge for discharge of an oxygen-free gas downwardly toward a tube support and a discharge for discharge of measured quantities of anaerobic bacteria toward the tube support. The gas discharge can be pivoted to a remote position.

---

The invention described herein was developed during the time a grant or award was available from the Department of Health, Education, and Welfare and the invention was tested in the course of work under a grant or award from the Department of Health, Education, and Welfare.

This invention relates to a transferring apparatus and more particularly to an apparatus for transferring anaerobic bacteria to a culture medium under oxygen-free conditions.

Anaerobic bacteria are bacteria which cannot survive in the presence of oxygen. Accordingly, when these bacteria are being studied or handled in any manner it is important that they be subjected to an oxygen-free environment. Anaerobes have been handled in the past in the presence of carbon dioxide, nitrogen and hydrogen. Considerable difficulty is encountered when the anaerobes are transferred to culture media since there is always a likelihood that the anaerobes or the culture media itself will be exposed to oxygen. Such exposure would result in the death of the anaerobes or in contamination of the media to the extent that the culture would not occur. A key difficulty in this area has been a lack of suitable equipment which can enable the bacteria to be transferred under oxygen-free conditions and at the same time facilitate the handling of the bacteria so that the work can be done quickly and efficiently with a minimum opportunity for the bacteria to be subjected to oxygen.

The particular techniques for isolating and identifying the different strains of anaerobic bacteria have been the subject of extensive study at the Anaerobe Laboratory at the Virginia Polytechnic Institute at Blacksburg, Va. This organization from time to time releases publications which reveal various techniques for isolating and identifying anaerobes.

The apparatus disclosed in this patent application is for implementing the testing and isolating procedure developed at the Anaerobe Laboratory. Additional reference is made to "Techniques for Routine Culture of Fastidious Anaerobes" by W. E. C. Moore; International Journal of Systematic Bacteriology; vol. 16 No. 2, April 1966; pages 173-190.

Accordingly, it is an object of this invention to provide a new and unobvious apparatus for transferring anaerobic bacteria.

It is a further object of this invention to provide an apparatus for transferring anaerobic bacteria to culture media.

It is another object of this invention to provide an apparatus for transferring anaerobic bacteria to culture media having foot pedals to free the hands of the apparatus operator.

It is still another object of this invention to provide an apparatus for transferring anaerobic bacteria to a culture media wherein the bacteria can be maintained in an oxygen-free environment.

It is a further object of this invention to provide an apparatus for transferring anaerobic bacteria having means for sterilizing the delivery conduit tip for the gas for the oxygen-free environment.

It is still a further object of this invention to provide an apparatus for transferring anaerobic bacteria to a culture media wherein a plurality of culture media can be operated upon simultaneously.

Generally the invention relates to an apparatus for transferring anaerobic bacteria to a culture medium comprising a frame, at least one means mounted on said frame for supporting a tube containing a culture medium, at least one means pivotally mounted on said frame and normally disposed in a first position for discharging an oxygen-free gas downwardly toward said tube supporting means, means mounted on said frame for discharging measured quantities of anaerobic bacteria toward one of said tube supporting means, and means for pivoting said pivotally mounted means for said first position to a second position remote therefrom.

Other objects and advantages of the subject invention will be apparent from a detailed description of a present preferred embodiment thereof, wherein:

FIG. 2 is a plan view of the apparatus shown in FIG. 1.

FIG. 3 is a sectional view taken along line 3—3 of FIG. 1.

FIG. 4 is a sectional view taken along line 4—4 of FIG. 2; and

FIG. 5 is a sectional view taken along line 5—5 of FIG. 4.

Figure 1:
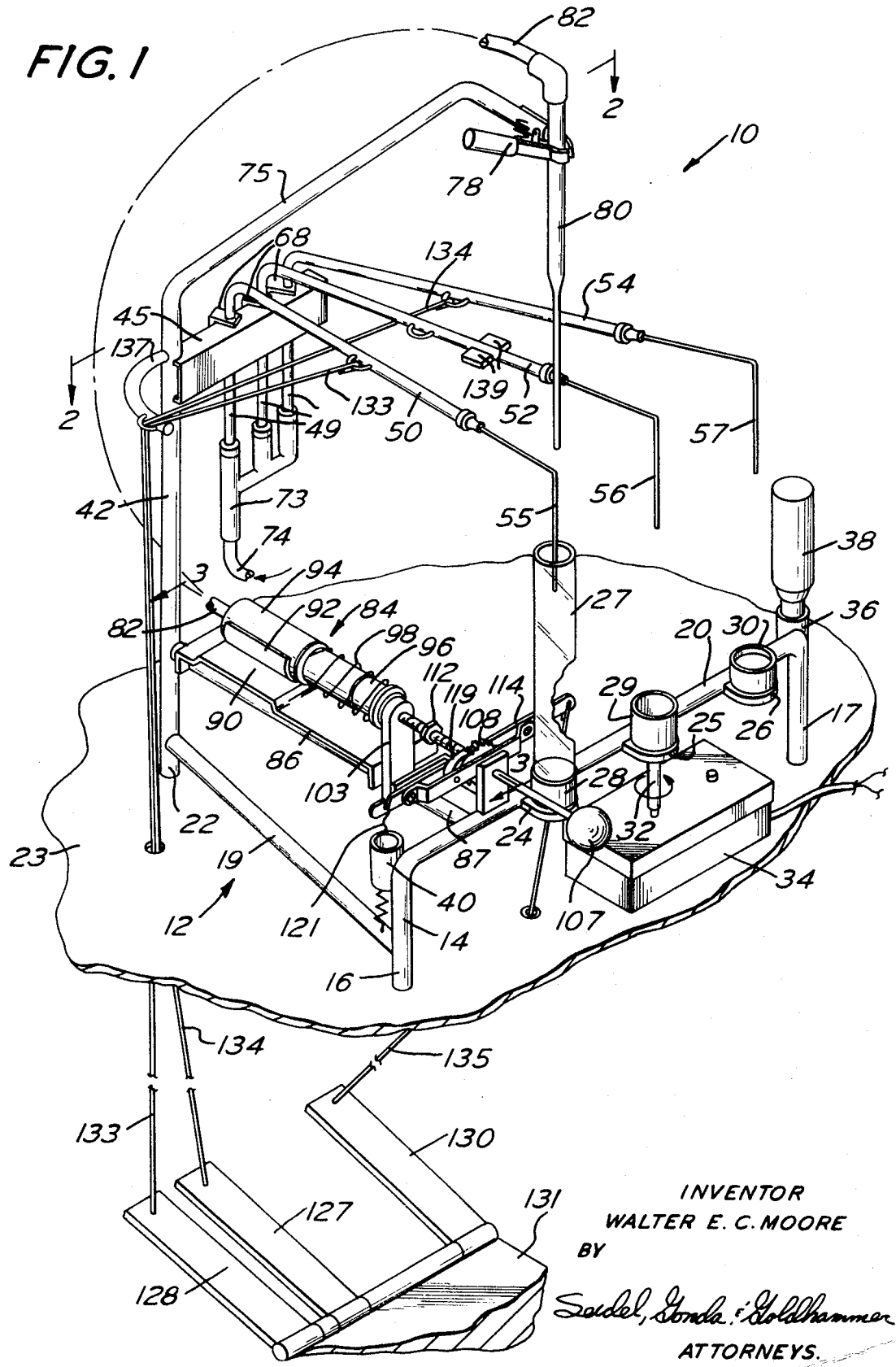
FIG. 1 is a top perspective view of a presently preferred form of the invention.

Referring now to the drawings, an apparatus 10 constructed in accordance with a presently preferred form of the invention is illustrated. The apparatus includes a tripod-like frame 12 having a generally U shaped front member 14 that includes vertically extending legs 16 and 17 and a horizontally extending portion 20. The front member 14 and the rear leg are connected by bar 19. The frame is shown resting on the top surface 23 of a table or counter.

A plurality of horizontally extending linearly spaced brackets 24, 25 and 26 are disposed along horizontal portion 20. Each of the brackets carries a device for supporting a tube 27 of culture medium. Preferably, the devices comprise relatively short hollow members 28, 29 and 30. If preferred, the walls of member 29 may be slightly higher than the other members and it may be provided with a bottom wall with a downwardly depending drive shaft 32. Shaft 32 is rotatably supported in a suitable aperture in bracket 25. A suitable means may be provided for selectively rotating member 29 and any tube supported thereby during procedures for isolation of bacterial colonies. Preferably such a means would include synchronous motor 34 which can rotate shaft 32 at a predetermined and carefully controlled angular velocity. It has been found that best results in isolation of bacteria colonies is achieved when the tube is rotated at a velocity of approximately 75 to 85 revolutions per minute.

Additionally, if desired the U shaped front member 14 can be provided at either end with a pen support 36 for a marking pen 38 and an auxiliary support 40.

The mid-portion 42 of leg 22, which is upwardly directed, supports a horizontally extending member 45 which may be a channel or angle. Member 45 has a plurality of horizontally spaced apertures 47 (FIG. 4) for rotatably receiving vertical portions 49 of a plurality of horizontal hollow conduits 50, 52 and 54. Each of the conduits supports a cannula 55, 56 and 57 at its end. Preferably, the cannulae are comprised of heavy gauge hypodermic needles that are bent into a right angle so that their discharge openings may be brought into vertical alignment with the aforementioned tube supports 28, 29 and 30.

As best seen in FIG. 2, each of the horizontal hollow conduits 50, 52 and 54 are normally disposed in position where they overlie the respective tube supports. Each is urged into this position by a torsion spring 60 (FIG. 4) which has one end 62 that bears against the interior wall of member 45 and has its second end 54 constrained by an opening at 66 in an angular member 68 which is fixed to a vertical bar 49 of the horizontal hollow conduits 50.

Each member 68 is slightly offset with respect to each of the hollow conduits 50, 52 and 54 so that one edge thereof acts as a stop to limit the counterclockwise rotation of those members as seen in FIG. 2.

A branched conduit 73 having one inlet 74 and three outlets is connected to each of the aforementioned vertical portions 49. The inlet of the conduit is connected to a source of oxygen-free gas. Gas coming from the gas source through the inlet is conducted by the hollow elongated conduits to each of the cannulae.

The rear leg 22 has a forwardly and upwardly extending portion 75 which carries a suitable clamping means 78 for supporting a pipette 80 in vertical alignment with one of the supports 28, 29 and 30. The pipette is connected to a syringe means 84 by a suitable flexible elongated conduit 82. As will be described in greater detail herein, the anaerobic bacteria are plased in pipette 80 for transfer to a suitable culture tube 27.

The syringe means 84 is mounted on a suitable support bar 86 that extends between rear leg 22 and horizontal portion 20 of the U shaped forward frame. In addition to serving as a support for the syringe means 84, bar 86 also promotes the rigidity of the apparatus since it complements the junction of bar 19. The support bar includes a portion 87, which functions as a stop member. Additionally, the support bar carries a bed 90 which supports a spring clamp 92. The syringe housing, which is a hollow elongated member 94 is resiliently held in position by the spring clip. At its closed end the syringe housing is connected to aforementioned conduit 82. At its open end the syringe housing receives an axially slidable plunger 96 which is biased by helical compression spring 98 toward the open end thereof. Brackets 100 and 102 (FIG. 3) are utilized to support a screw and ratchet set which is used to advance the plunger, against the force of spring 98, into the syringe. Bracket 100 is provided with a threaded hole 103 while bracket 102 is provided with a slightly larger smooth hole 105. In order to facilitate manipulation of the screw, its free end may be provided with a knob 107.

A suitably constructed ratchet wheel 108 is fixed to an intermediate portion of shaft 106. The rachet wheel is arranged so that when it is driven it tends to advance the screw into engagement with the plunger. Consequently, in order to avoid damage to the plunger and to prevent it from being driven too far into the syringe housing, a suitable stop is provided on the screw. The stop may take the form of an ordinary nut 112 which is welded or otherwise fastened to the screw.

A bracket 114 comprising two spaced elongated straps having opposed smooth apertures 116 therein is mounted for pivotal movement about screw 104. The bracket straddles the ratchet wheel 108 so that a pawl 119 which is pivotally supported by the bracket can be swung into and out of engagement with the teeth of ratchet wheel 108.

As shown in FIG. 1, bracket 114 is biased by a suitable spring 121 so that the pawl 119 is normally in position to engage the ratchet wheel for the incremental rotation. The opposite end of the bracket is connected to a means, described in detail below, for overcoming the force of spring 121 and driving the ratchet.

It should be noted that stop 87 acts as a limit to prevent spring 121 from becoming slack. Additionally, a second stop 124 (FIG. 2) which depends from support bracket 100 acts to stop the rotation of bracket 114 to thereby limit the degree of rotation of the ratchet wheel 108 when a force is applied to the bracket.

During the utilization of this device for treating and transferring the anaerobic bacteria, control over each of the cannulae and the syringe is most important. In particular, when handling a large number of culture media it is likely that the latter media may be contaminated by the former media by virtue of materials which are transferred by the cannulae. Thus, it is necessary to provide a means for sterilizing the cannulae. Accordingly, a device had been provided whereby the operator by controlling two foot pedals may selectively sterilize one of the cannulae or all of them. Such a device is shown in FIGS. 1 and 2 wherein each of the horizontal hollow conduits 50, 52 and 54 is pivotable about its own axis. As can be seen in FIG. 2, the arcs swept by the cannulae supported by these conduits substantially intersect at a point spaced from the frame. Thus, a suitable sterilizing means placed at that point can serve sterilize all of the cannulae. A preferred technique for sterilizing includes the use of a Meeker burner which is a bunsen burner having a metal screen in an enlarged opening. Such an arrangement permits intimate mixture of gas and air to produce a high temperature. Accordingly, a Meeker burner 126 is shown in phantom at the place where each of the aforementioned arcs coincide.

The cannulae are moved from the position shown in solid lines by operation of pedals 127 and 128. Additionally, a pedal 130 is provided for a purpose to be explained. Each of the pedals is connected by a suitable hinge to a support 131. Pedal 127 is connected by a line 134 to elongated conduit 54. Pedal 128 is connected by line 133 to elongated conduit 50. Both of these lines are entrained over a suitable support member 137 which is fixed to mid-portion 42 of the rear leg. It is apparent that by depressing pedal 128 the cannula attached to conduit 50 will be brought over the flame while depressing pedal 127 brings all of the cannula over the flame. Both lines may pass through a suitable opening in surface 23. In order to prevent damage or interference between the elongated conduits when pedal 128 is depressed the central hollow conduit is provided with a spacer 139.

Pedal 130 is connected, by means of line 135, to the far end of ratchet support bracket 114. Line 135 is run through an opening on surface 23. Accordingly, depression of pedal 130 causes bracket 114 to rotate clockwise (FIG. 1) thereby causing pawl 119 to rotate the ratchet wheel 108 and advance the screw against plunger 96. When the plunger is advanced the bacteria are discharged from the pipette into tube 27. By controlling the number of teeth on the ratchet or the degree of rotation permitted bracket 114, the amount of bacteria which is discharged from pipette 80 can be carefully controlled to a predetermined quantity.

The above-described device is efficient and convenient in transferring culture of anaerobic bacteria. The device is utilized by initially connecting the inlet 74 of branch conduit 73 to a suitable source of oxygen-free gas. Carbon dioxide or nitrogen may be used alone or in combination with hydrogen or any other oxygen-free gas, depending on the requirements of the bacteria studied. Most anaerobes are stimulated by a carbon dioxide atmosphere, however some require other gases.

The tubes containing the culture media after having been unstoppered are placed into the tube support 28, 29 and 30 with their respective cannulae inserted therein. Thus, each of the cannulae discharges oxygen-free gas into its respective tube. The stream of oxygen-free gas prevents the entrance of air into the mouth of the tube. The tube supported by member 30 is in a standby or ready position. The tube in member 28 is shown about to receive a transfer of anaerobic bacteria from pipette 80. The transfer is achieved by virtue of having the operator depress pedal 130. This causes the screw 104 to rotate thereby causing the plunger 96 to move forwardly into the syringe housing 94. After the transfer has been made the tube may be placed in support member 29, which is rotating under the force of synchronous motor 34. As indicated above, the tube should be driven at an angular speed of approximately 75 to 80 revolutions per minute. During this time a loop can be drawn up the surface of an agar medium, previously hardened on the walls of the tube, for the purpose of producing isolated colonies of bacteria.

After the above-described technique is completed, pedal 127 is depressed to bring all of the cannulae over the aforementioned burner 126 where they are sterilized. Release of the pedal causes the cannulae to reassume their original positions over the supports. If it is only necessary to sterilize the cannulae underlying pipette 80, then only pedal 128 is depressed.

It should be understood that while although the apparatus has been described in connection with a plurality of members supported by a framework it is clear that any solid or integral structure having the same articulations could be utilized. Additionally, it should be apparent that in lieu of the elongated flexible members 133, 134 and 135 disclosed, push-pull rods, Bowen cables or any other suitable means for transmitting motion could be employed.

Accordingly, while the invention has been described with reference to a particular preferred embodiment thereof, it should be apparent that many other embodiments and forms thereof will be obvious to those skilled in the art in view of the foregoing specification. Therefore, the scope of this invention should not be limited by the description of the particular embodiment set forth above, but rather only by the scope of the claims attached hereto.

I claim:

1. An apparatus for transferring anaerobic bacteria to a culture medium comprising a frame at least one means mounted on said frame for supporting a tube containing a culture medium, at least one means pivotally mounted on said frame and normally in a first position for discharging an oxygen-free gas downwardly toward said tube supporting means, means mounted on said frame for discharging measured quantities of anaerobic bacteria toward one of said tube supporting means, and means for pivoting said pivotally mounted means from said first position to a second position remote therefrom.

2. A device as defined in claim 1 wherein said pivotally mounted means includes a conduit connected to a source of such oxygen-free gas, means for biasing said pivotally mounted means into said first position, means having one end operatively connected to said pivotally mounted means for moving it against said bias to said second position, and the other end of said means being connected to foot pedal means.

3. A device as defined in claim 2 wherein one of said tube supporting means is mounted for rotation about the longitudinal axis of a tube to be supported therein.

4. A device as defined in claim 2 wherein there are a plurality of tube supporting means on said frame, said plurality of tube supporting means being disposed in spaced array, said pivotally mounted means including a plurality of conduits, each of said conduits being pivotally mounted to said frame and having one end connected to a source of such oxygen-free gas and another end for discharging said gas, and each of said conduits is normally biased to a first position wherein said other end of each of said conduits overlies one of said tube supporting means and is movable to a second position wherein each of said other ends of said conduits are substantially coincident.

5. A device as defined in claim 4 wherein said means for pivoting said conduits to said second position comprises at least two members, one of said members being operative to move one of said conduits to said second position, another of said members being operative to move all of said conduits to said second position, and each of said members is connected to a separate foot pedal.

6. A device as defined in claim 1 wherein said anaerobic bacteria discharge means is a pipette having its outlet overlying said tube supporting means, a syringe supported by said frame, said syring including a body and a plunger, a conduit connecting said body to said pipette, a ratchet means connected to said plunger for advancing it into said housing and spring means for urging said plunger against said ratchet means 7. A device as defined in claim 6 including a foot pedal, said ratchet being driven by an elongated member having one end connected thereto and having its other end connected to said pedal.

References Cited

UNITED STATES PATENTS 3,188,181    6/1965    Peterson et al.

A. LOUIS MONACELL, Primary Examiner

R. M. ELLIOTT, Assistant Examiner

U.S. Cl. X.R.

195—120